(12) United States Patent
Reilley et al.

(10) Patent No.: US 7,617,935 B2
(45) Date of Patent: Nov. 17, 2009

(54) REUSABLE CHILD-RESISTANT, SENIOR FRIENDLY UNIT DOSE CONTAINER

(75) Inventors: Shawn P. Reilley, Belvidere, IL (US); Curtis Knutson, Loves Park, IL (US); Ronald J. Seibert, Machesney Park, IL (US)

(73) Assignee: Anderson Packaging, Inc., Rockford, IL (US)

( * ) Notice: Subject to any disclaimer, the term of this patent is extended or adjusted under 35 U.S.C. 154(b) by 62 days.

(21) Appl. No.: 11/972,181

(22) Filed: Jan. 10, 2008

(65) Prior Publication Data
US 2009/0178948 A1 Jul. 16, 2009

(51) Int. Cl.
B65D 83/04 (2006.01)

(52) U.S. Cl. .................. 206/530; 206/1.5; 206/531; 206/539

(58) Field of Classification Search ............ 206/1.5, 206/528, 530, 531, 532, 535, 538, 539
See application file for complete search history.

(56) References Cited

U.S. PATENT DOCUMENTS

| | | | |
|---|---|---|---|
| 2,790,587 | A | 4/1957 | Contant |
| 3,072,276 | A | 1/1963 | Nichols |
| 3,429,426 | A | 2/1969 | Wolf et al. |
| 3,504,788 | A | 4/1970 | Gray |
| D217,900 | S | 6/1970 | Gray |
| 3,811,564 | A | 5/1974 | Braber |
| 3,888,350 | A | 6/1975 | Horvath |
| 3,942,630 | A | 3/1976 | Phillips |
| 4,048,050 | A | 9/1977 | Hillman |
| 4,120,400 | A | 10/1978 | Kotyuk |
| 4,125,190 | A | 11/1978 | Davie, Jr. et al. |
| 4,126,224 | A | 11/1978 | Laauwe et al. |
| 4,192,422 | A | 3/1980 | Kotyuk |
| 4,375,858 | A | 3/1983 | Shah et al. |
| 4,511,032 | A | 4/1985 | Bush |
| 4,817,819 | A | 4/1989 | Kelly |

(Continued)

FOREIGN PATENT DOCUMENTS

DE    10355803 A1    6/2005

(Continued)

OTHER PUBLICATIONS esp@cenet database, one page English language Abstract for DE 10355803, Jun. 30, 2005.

*Primary Examiner*—Luan K Bui
(74) *Attorney, Agent, or Firm*—Howson and Howson LLP (57) ABSTRACT

A child-resistant and senior-friendly unit dose package has a hollow container body containing a separate tray carrying a plurality of tablets or like items for being dispensed from the container body. The container body has an end with an opening, and the tray can be slid to a retracted position in which the tray is located within the container body and a dispensing position in which a proximal end part of the tray extends through the opening of the container body. The package includes a separate cap removably securable to the container body to seal the opening and prevent access to the trays. The container body can be positioned in a tray re-loading position that permits a spent tray to be removed from the container body and replaced with a new tray. Thus, the container body is reusable.

23 Claims, 5 Drawing Sheets

U.S. PATENT DOCUMENTS

| | | |
|---|---|---|
| 4,889,238 A | 12/1989 | Batchelor |
| 5,050,739 A | 9/1991 | Hannan et al. |
| 5,082,137 A | 1/1992 | Weinstein |
| 5,265,728 A | 11/1993 | Allendorf et al. |
| 5,275,291 A | 1/1994 | Sledge |
| 5,339,960 A | 8/1994 | Price |
| 5,346,069 A | 9/1994 | Intini |
| 5,379,899 A | 1/1995 | Thurell |
| 5,740,938 A | 4/1998 | Hofmann et al. |
| 5,755,020 A | 5/1998 | Panyon et al. |
| 5,758,774 A | 6/1998 | Leblong |
| 5,878,887 A | 3/1999 | Parker et al. |
| 5,915,559 A | 6/1999 | Hulick et al. |
| 6,021,901 A | 2/2000 | Wolfe |
| 6,036,018 A | 3/2000 | Harrold |
| 6,161,699 A | 12/2000 | Gartland |
| 6,230,893 B1 | 5/2001 | Karow |
| 6,247,595 B1 * | 6/2001 | Omata et al. ............... 206/538 |
| 6,349,831 B1 | 2/2002 | Buss |
| 6,401,926 B1 | 6/2002 | Lo |
| 6,460,693 B1 | 10/2002 | Harrold |
| 6,540,081 B2 | 4/2003 | Balz et al. |
| 6,679,381 B1 | 1/2004 | Bush |
| 6,708,826 B1 * | 3/2004 | Ginsberg et al. ........... 206/535 |
| 6,789,677 B2 | 9/2004 | Maietta |
| 6,832,686 B2 | 12/2004 | Donegan |
| 6,863,175 B2 | 3/2005 | Gelardi |
| 6,874,636 B2 | 4/2005 | Paliotta et al. |
| 6,896,137 B2 | 5/2005 | McHutchinson |
| 6,913,149 B2 | 7/2005 | Gelardi et al. |
| 7,093,736 B2 | 8/2006 | Maietta et al. |
| 7,175,044 B2 | 2/2007 | Benktzon et al. |
| 7,347,325 B2 * | 3/2008 | O'Neill et al. ............... 206/449 |
| 7,370,773 B2 | 5/2008 | Toth et al. |
| 2003/0080021 A1 | 5/2003 | Kopecky |
| 2003/0136698 A1 | 7/2003 | Klatt |
| 2004/0045858 A1 | 3/2004 | Harrold |
| 2004/0256277 A1 | 12/2004 | Gedanke |
| 2005/0115862 A1 | 6/2005 | Maietta |
| 2005/0183981 A1 * | 8/2005 | Gelardi ....................... 206/531 |
| 2005/0199527 A1 | 9/2005 | Ellis et al. |
| 2006/0006091 A1 | 1/2006 | Maietta |
| 2007/0023317 A1 | 2/2007 | Brozell et al. |
| 2007/0039851 A1 | 2/2007 | Rasanen et al. |
| 2007/0045150 A1 | 3/2007 | Huffer et al. |
| 2007/0102318 A1 * | 5/2007 | Gelardi et al. ............... 206/538 |
| 2007/0138049 A1 | 6/2007 | Bitner |
| 2007/0235368 A1 | 10/2007 | Knutson et al. |
| 2009/0045096 A1 | 2/2009 | Knutson et al. |
| 2009/0095649 A1 * | 4/2009 | Costa .......................... 206/530 |

FOREIGN PATENT DOCUMENTS

| | | |
|---|---|---|
| EP | 1088769 A1 | 4/2001 |
| GB | 2319244 A | 5/1998 |
| WO | 02/06135 A1 | 1/2002 |

* cited by examiner

REUSABLE CHILD-RESISTANT, SENIOR FRIENDLY UNIT DOSE CONTAINER

BACKGROUND OF THE INVENTION

The present invention relates to a container, or package, for containing items, such as doses of medicine, that can be dispensed therefrom, and more particularly, the present invention relates to a unit dose package that includes a blister or blister card and that has child-resistant, senior-friendly dispensing properties.

Paperboard unit dose packages for use in dispensing medicine tablets are disclosed by U.S. Pat. Nos. 6,047,829 issued to Johnstone et al., 6,874,636 B2 issued to Paliotta et al., and 6,230,893 B1 issued to Karow. Other containers for pills and the like are disclosed by U.S. Patent Application Publication Nos. 2005/0183981 A1 of Gelardi, 2005/0115862 A1 of Maietta, and 2005/0199527 A1 of Ellis et al., and by U.S. Pat. Nos. 4,192,422 and 4,120,400 issued to Kotyuk, 4,817,819 issued to Kelly, 6,349,831 B1 issued to Buss, 6,789,677 B2 issued to Maietta, 4,126,224 issued to Laauwe et al., 6,896,137 B2 issued to McHutchinson, 6,460,693 B1 issued to Harrold, 5,082,137 issued to Weinstein, 3,942,630 issued to Phillips, 5,878,887 issued to Parker et al., 6,401,926 B1 issued to Lo, 4,511,032 and 6,679,381 B1 issued to Bush, 6,021,901 issued to Wolfe, 6,832,686 B2 issued to Donegan, 5,346,069 issued to Intini, 6,913,149 B2 issued to Gelardi et al., 6,863,175 B2 issued to Gelardi, 6,540,081 B2 issued to Balz et al., 3,504,788 issued to Gray, 5,740,938 issued to Hofmann et al., and 4,048,050 issued to Hillman.

Although the above referenced unit dose packages and pill boxes disclosed by the above referenced patents and published applications may be satisfactory for their intended purposes, there is a need for a unit dose package of novel construction that is difficult for a child to open, yet readily opened and closed by an intended end-user, such as a senior citizen. Preferably, the container includes a blister, blister card, tray or the like on which numerous items, such as doses of medicine, are individually secured. The blister, blister card or tray should be able to be slid between a retracted position in which the items are protected and housed within the package and a dispensing position in which the blister, blister card or tray extends in an exposed condition from the package, but remains connected to the package. In addition, preferably a spent blister card should be capable of being removed from the package and replaced with a fresh new blister card thereby permitting the unit dose container or package to be reusable.

BRIEF SUMMARY OF THE INVENTION

According to the present invention, a package for storing and dispensing tablets and like items is provided. The package includes a hollow plastic container body having a closed end and an opposite dispensing end that has an elongate opening defined by a rim. Preferably, the container body is formed from opposed front and rear body sections interconnected at the closed end via an end wall including at least one hinge. At least one of the front and rear body sections is capable of pivoting about the hinge so that the body sections can be disposed in a closed position to form the assembled hollow container body and in an open loading or re-loading position. A separate tray carries a plurality of tablets or items and is storable within the container body. The tray is slidable relative to the container body between a retracted position in which the tablets or items are located entirely within the container body and a dispensing position in which a proximal part of the tray holding the tablets or items extends through the open end of the container body to a position external of the container body. A distal end part of the tray is captured and retained within the assembled container body when the tray is in the dispensing position. Preferably, the package includes a cap for sealing the container closed.

Preferably, the front and rear body sections include locking portions that cooperatively engage to lock the front and rear body sections in the closed position. For example, the locking portion of one of the front and rear body sections can include a latch, and the locking portion of the opposite body section can include a locking recess into which the latch is extendable. Preferably, the container body includes one or more tabs that can be depressed to disengage the locking portions thereby permitting at least one of the front and rear body sections to pivot about the hinge to the open loading or re-loading position. Accordingly, a first tray is removable from the body sections and is replaceable with a second tray. Thus, the container body can be repeatedly re-loaded and reused with additional trays carrying a fresh supply of tablets or like items to be dispensed.

BRIEF DESCRIPTION OF THE DRAWINGS

The present invention should become apparent from the following description when taken in conjunction with the accompanying drawings, in which.

DETAILED DESCRIPTION OF THE INVENTION

Figure 1:
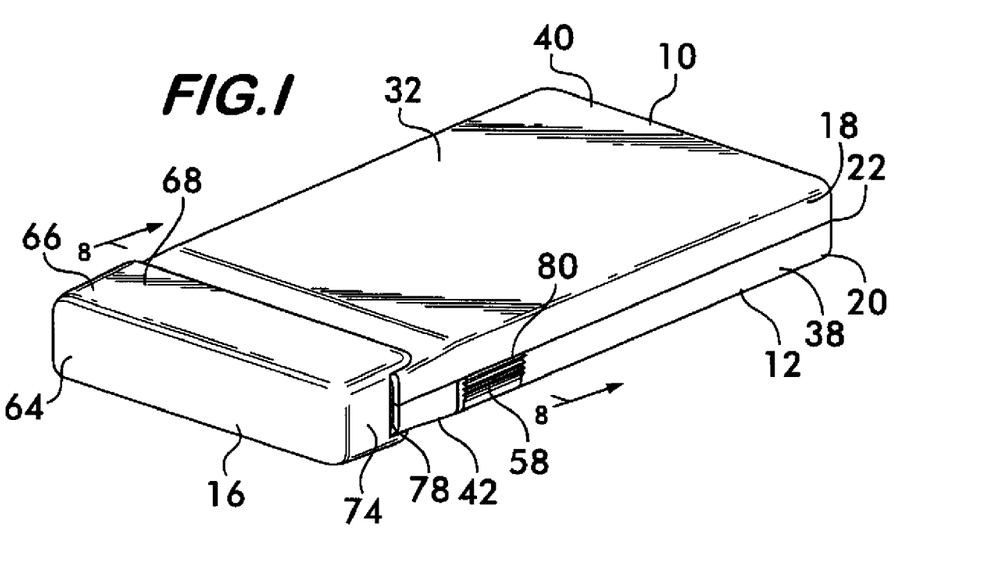
FIG. 1 is perspective view of an assembled container with a cap according to the present invention.

A package 10 according to the present invention is illustrated in FIG. 1 and includes a hollow container body 12, a separate tray or card 14 to which a plurality of separate dispensable items are carried, and a separate removable cap 16. The package 10 is similar in some ways to the packages disclosed in co-pending U.S. patent application Ser. No. 11/619,680 filed on Jan. 4, 2007 and co-pending U.S. patent application Ser. No. 11/839,982 filed on Aug. 16, 2007, the disclosures of which are incorporated herein by reference.

The body 12 and cap 16 of the present invention are molded of a thermoplastic material, such as polypropylene, and when assembled, are shaped to contain and restrict access to the separate tray or blister card 14. The body 12 can be of a generally compact configuration such as being substantially flat and rectangular for instance as illustrated in FIG. 1. The body 12 and cap 16 are made by injection-molding techniques; however, blow-molding, thermoforming, or other molding techniques can also be utilized.

Figure 2:
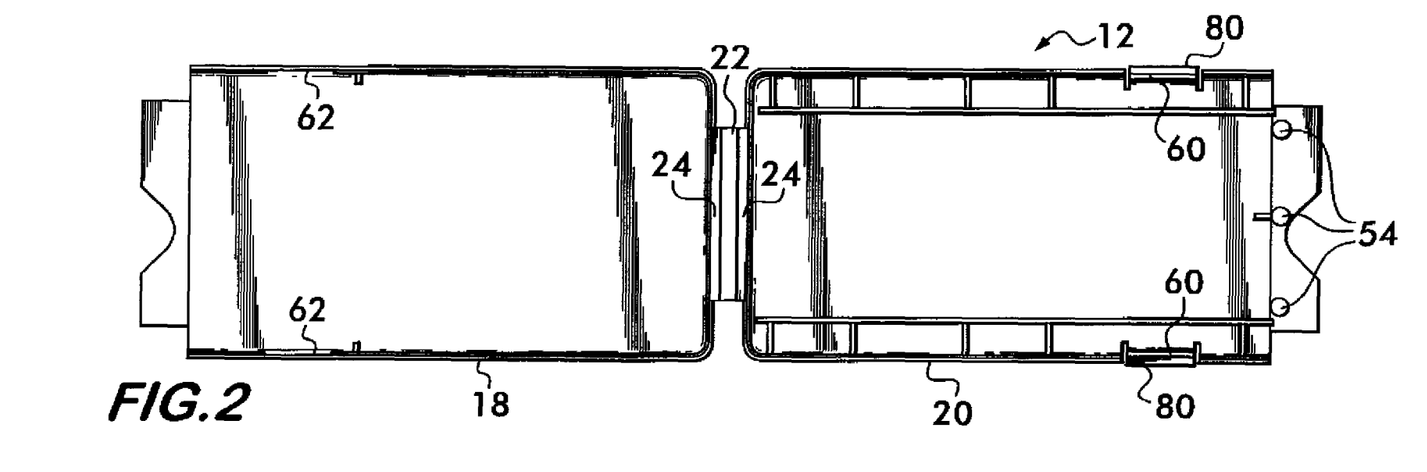
FIG. 2 is a plan view of the container body of FIG. 1 disposed in an open loading position.

As best illustrated in FIG. 2, the container body 12 is preferably formed by a pair of opposed front and rear body sections, 18 and 20, interconnected by an end wall section 22 including at least one hinge 24. Thus, the container body 12 has a so-called "clam shell" type construction. By way of example, each of the body sections, 18 and 20, can form about half of the container body 12 and can be pivotable, or foldable, about the hinge or hinges 24 to a closed position thereby forming the assembled container body 12 illustrated in FIG. 1. Preferably, the body 12 consists of a one-piece injection-molded body and has a live hinge 24 formed between the end wall 22 and each body section, 18 and 20. As an alternative construction, the body sections 18 and 20 can be separate and thereafter assembled and/or connected together.

The trays 14 are preferably blister cards or the like that carry a plurality of separate items in separate blister compartments 26 so that the items can be removed individually from the card 14. The trays or blister cards 14 can be made of plastic, paperboard, paper, foil or the like. For example, the card 14 can include a transparent plastic layer 28 defining the compartments 26 and a rupturable paper and/or foil backing 30 laminated to layer 28 to seal the items in the compartments 26. The tray or blister card 14 may contain doses of medicine, vitamins, supplements, or any other product that is provided in tablet or like form.

When the container body 12 is assembled and loaded with a tray or card 14, the plastic body 12 includes opposite front and rear walls 32 and 34, opposite sidewalls 36 and 38, a closed end 40, and an opposite open end 42. A mouth finish 44 of the container body 12 includes a rim 46 that defines a substantially rectangular, elongate opening 48 through which the tray or blister card 14 can be extended from the assembled container body 12. The tray or card 14 can also be disposed in a retracted storage position in which the tray 14 is contained and housed substantially entirely within the confines of the container body 12. In this position, none of the tablets or items carried by the tray or card 14 can be accessed or dispensed from the package 10. The cap 16 can be applied to and/or removed from the container body 12 when the tray or card 14 is in the retracted storage position.

After the cap 16 is removed from the container body 12, the tray 14 is free to slide relative to the container body 12 through the elongate opening 48 to the dispensing position. In this position, a proximal end part 50 of the tray or card 14 is located external of the container body 12 allowing the tablets or items on the tray or card 14 to be readily accessed and dispensed. However, a distal end part 52 of the tray or card 14 remains in the container body 12 and is prevented from passing through the opening 48. Thus, the tray or card 14 can be accessed and positioned in a dispensing position via the opening 48 but cannot be completely removed form the assembled container body 12 through the opening 48.

Preferably, one or more flanges, posts, walls or the like 54 depend from one of the body sections, 18 or 20, within the container body 12 transversely across and adjacent the open end 42 of the container body 12, and at least one flange, post, raised wall or the like 56 projects from the distal end part 52 of the tray or card 14. The flange, post, wall or the like 54 of the body section, 18 or 20, cooperatively engages the flange, post, wall, or the like 56 of the tray or card 14 to block and restrict the distal end part 52 of the tray or card 14 from passing through the opening 48 of the assembled container body 12. Accordingly, the distal end part 52 of the tray or blister card 14 is captured within the assembled container body 12. Other alternative mechanisms for restricting movement or removal of the tray 14 relative to the container body 12 can be used.

The separate cap 16 is securable to the body 12 to seal the open end 42 and is removable from the body 12 to permit the tray 14 to be freely slid through the open end 42 into the dispensing position discussed above. The cap 16 can be repeatedly attached to and removed from the container body 12. Preferably, the connection formed between the cap 16 and container body 12 is one that prevents unwanted dislodgement by young children, yet is readily removable by adults including seniors.

One of the novel aspects of the present invention is that the package 10 is intended to be reloaded and reused repeatedly throughout its useful life. For instance, after all the tablets or items carried by a first tray or card are dispensed, the first tray or card can be removed from the container body 12 and replaced with a new second tray or card providing a new fresh set of tablets or items to be dispensed from the package 10. This tray or card replacement process is intended to be repeated many times before ultimate disposal and/or recycling of the container body 12. The spent trays removed from the package can be refilled, recycled, or simply discarded.

Figure 3:
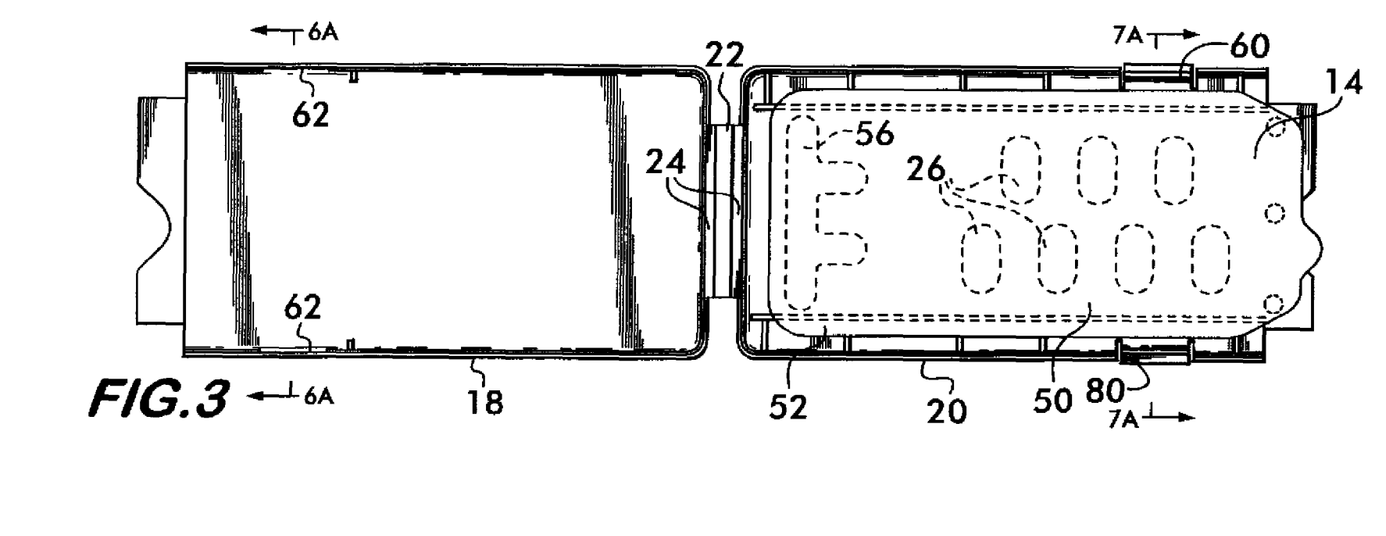
FIG. 3 is a plan view of the container body illustrated in FIG. 2 in which a blister card has been inserted.
Figure 4:
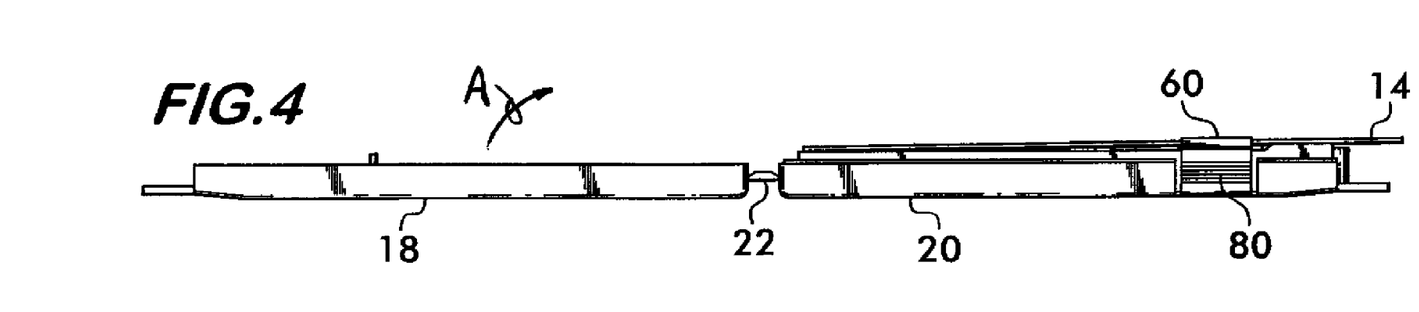
FIG. 4 is a side elevational view of the container body and blister card of FIG. 3.
Figure 5:
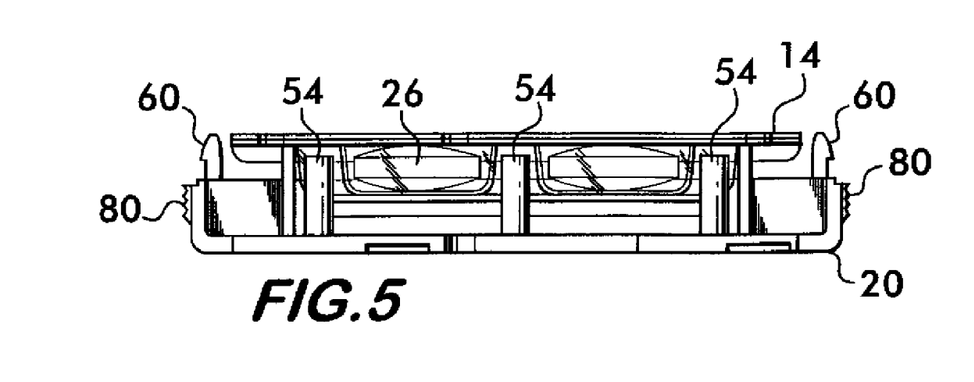
FIG. 5 is an end elevational view of the container body and blister card of FIG. 4.
Figure 6A:
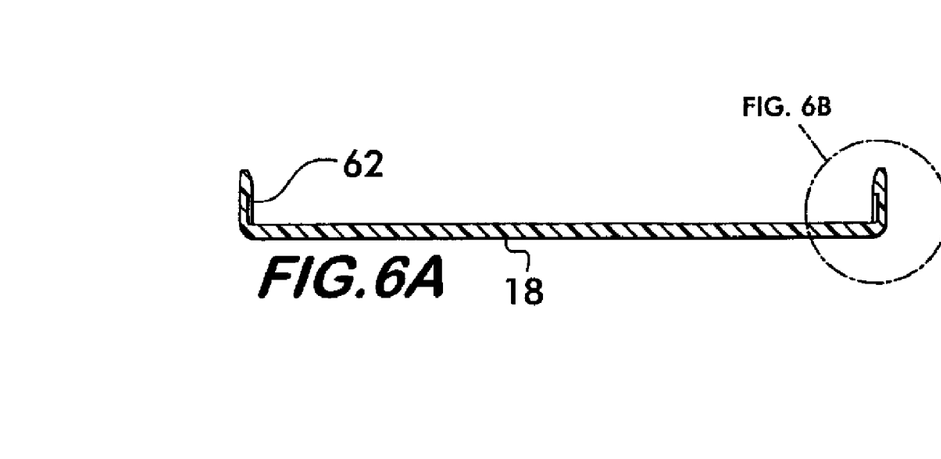
FIG. 6A is cross-sectional view taken along line 6A-6A of FIG. 3.
Figure 6B:
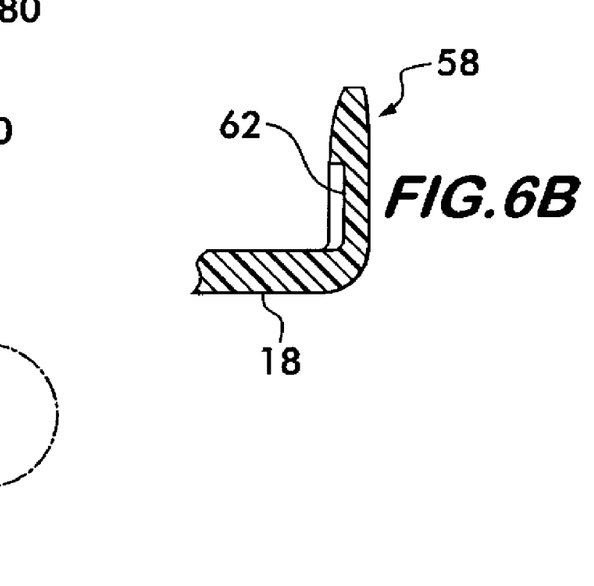
FIG. 6B is a magnified view of a locking portion of FIG. 6A.
Figures 7A, 7B:
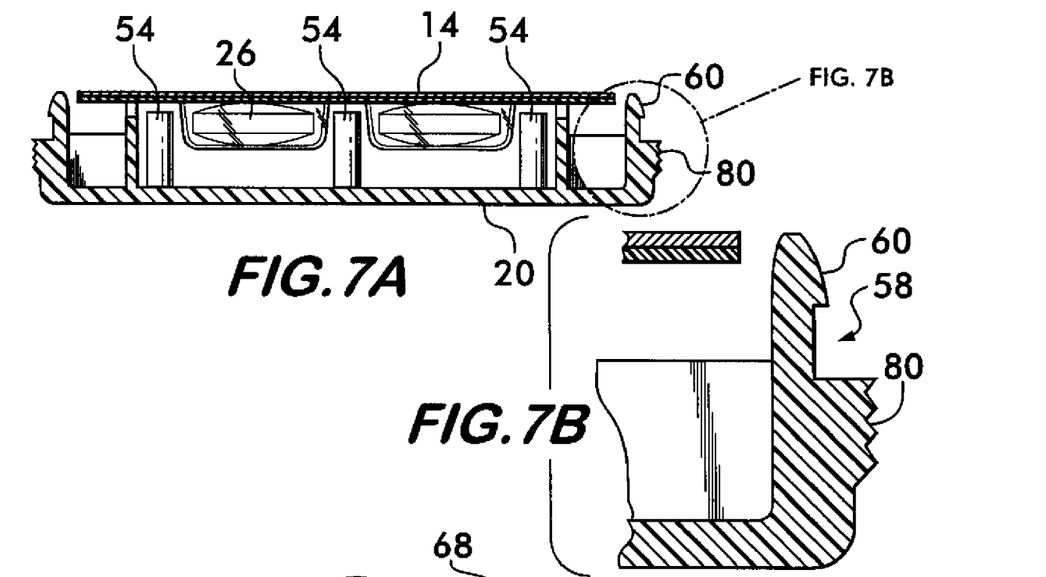
FIG. 7A is a cross-sectional view taken along line 7A-7A of FIG. 3.
FIG. 7B is a magnified view of a latch of FIG. 7A.

For purposes of initially loading a tray or card or subsequently removing a spent tray or card and replacing with a new tray or card, the body sections, 18 and 20, are disposed in an open position. For example, as best illustrated in FIG. 3, a separate tray or blister card 14 is shown placed or loaded into the body section 20. Of course, the blister card 14 can also be readily removed and replaced with another blister card when the body 12 is in this open position. After one of the body sections, 18 or 20, is loaded with a new tray or card 14, one or both of the body sections, 18 and 20, are pivoted about the hinge or hinges 24 (see arrow "A" in FIG. 4) into the assembled container configuration illustrated in FIG. 1.

The front and rear body sections, 18 and 20, are locked in the closed assembled container configuration via cooperatively engaging portions 58 of the body sections, 18 and 20. For example, these locking portions 58 can be located on each sidewall, 36 and 38, adjacent the open end 42 of the assembled container body 12. For example, the body section 20 can include a pair of upstanding latches 60 that are receivable within a pair of locking recesses 62 formed in the body section 18. The latches 60 are resilient such that, when the body sections, 18 and 20, are folded together, the latches 60 automatically snap into the recesses 62 thereby locking the body sections 18 and 20 together. In this condition, the tray or card 14 can be slid and extended through the opening 48 of the container body 12 but cannot be completely released from the container body 12.

Figure 8:
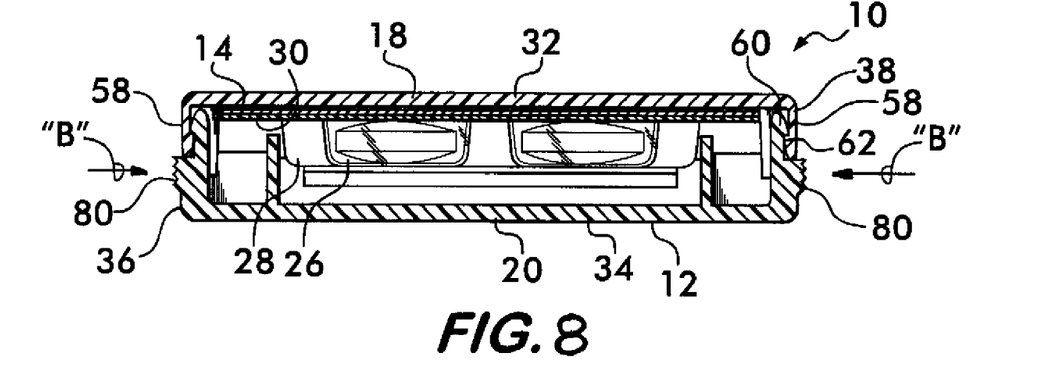
FIG. 8 is a cross-sectional view taken along line 8-8 of FIG. 1.

When a tray or card 14 requires replacement, the locking portions 58 can be manipulated by the end user to cause the latches 60 to be released from the recesses 62. This is preferably accomplished with the use of a pair of opposed tabs 80 on the sidewalls, 36 and 38. The tabs 80 can be simultaneously pressed together, for instance with pressure applied between the thumb and index finger of the end user (see arrows "B" in FIG. 8), to disengage the latches 60 from the recesses 62. While this "pinching" manipulation can be readily accomplished by an adult, it is not readily accomplished by a young child. In this unlocked condition, the body sections, 18 and 20, can swing open to permit the tray or card to be removed and replaced with a new tray or card. Thus, the container body 12 can be reloaded with new blister cards repeatedly throughout its life.

Figure 9:
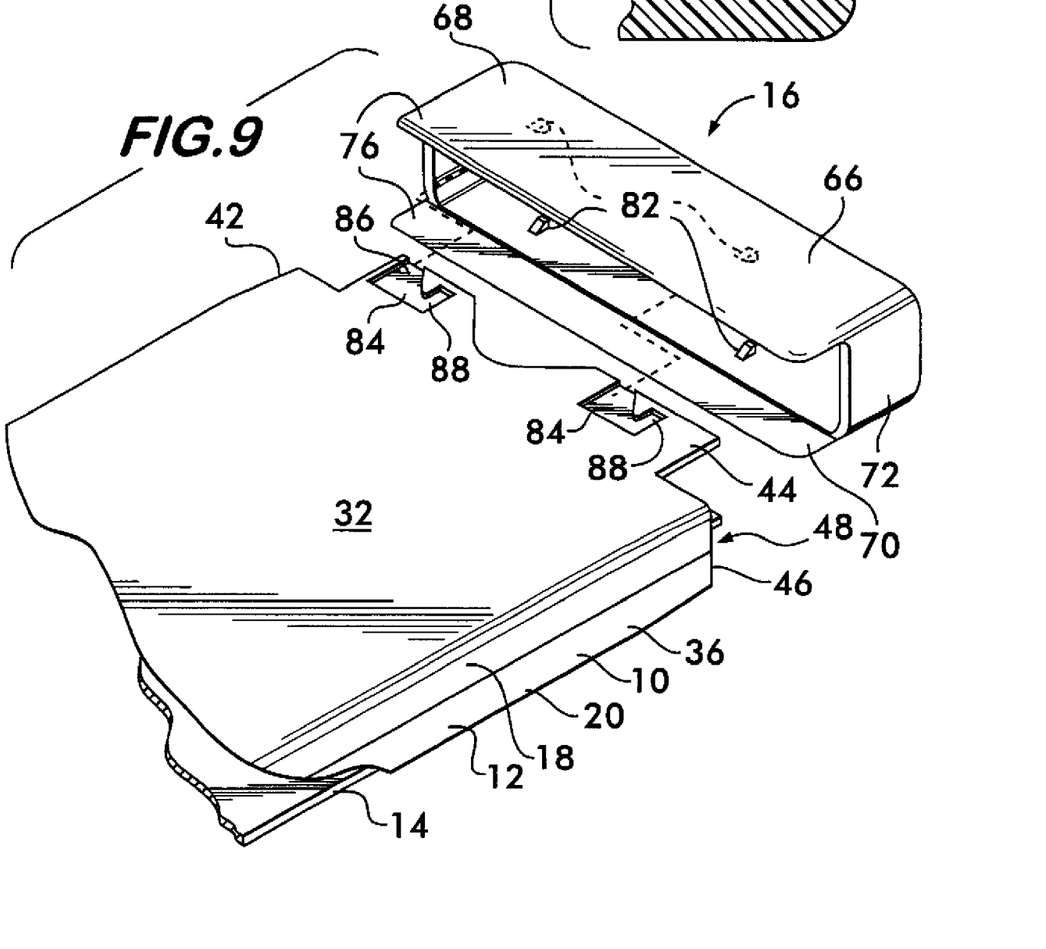
FIG. 9 is a perspective view of the open end of the container body of FIG. 1 with the cap removed.
Figure 10:
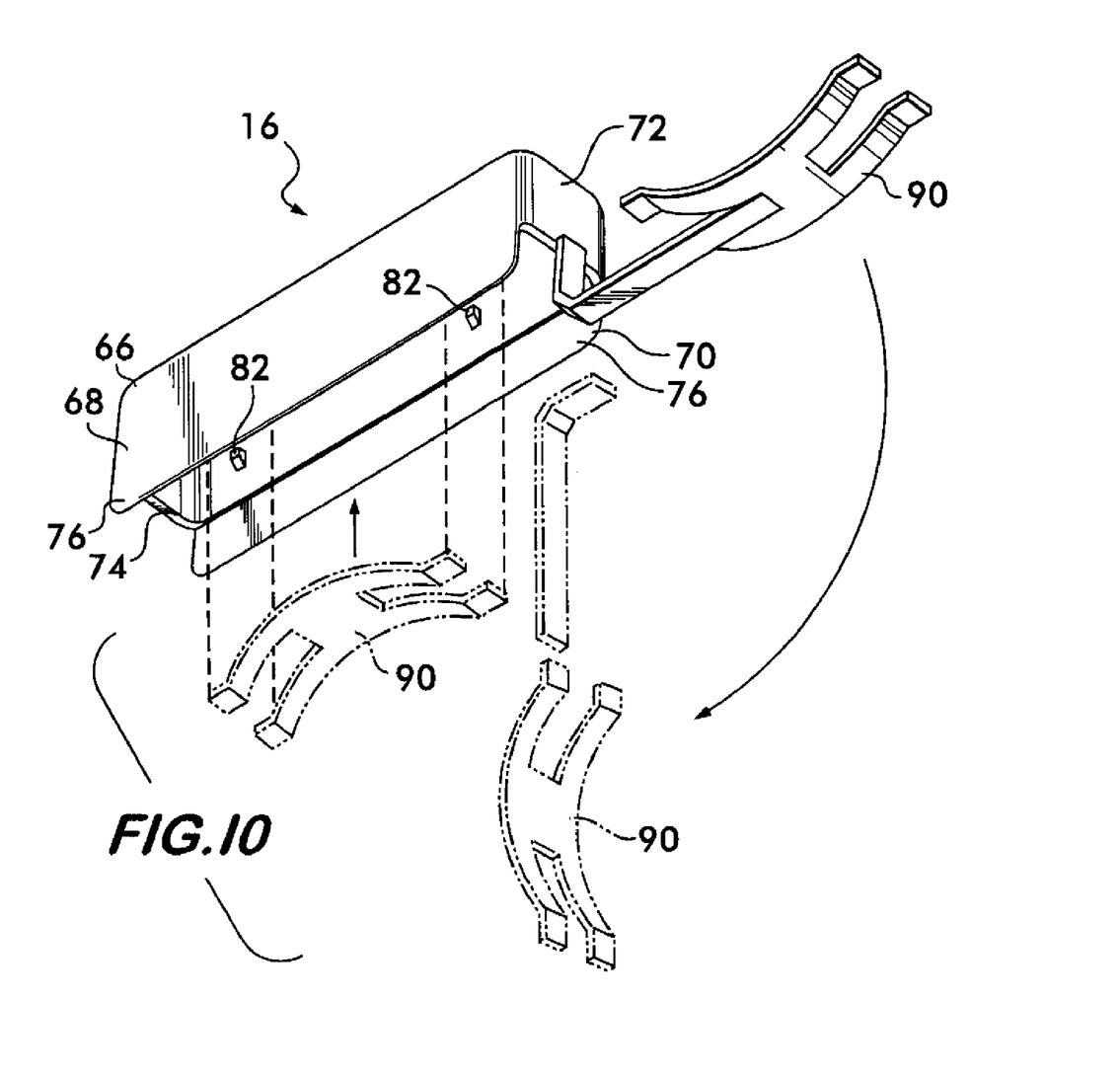
FIG. 10 is a perspective view of the cap of FIG. 1, as manufactured.

With respect to the cap 16, it is similar to those disclosed in co-pending U.S. patent application Ser. No. 11/619,680 filed on Jan. 4, 2007 and co-pending U.S. patent application Ser. No. 11/839,982 filed on Aug. 16, 2007 referenced above. For example, the cap 16 includes an end wall 64 that corresponds to and is designed to span and obstruct access to the elongate opening 48 of the container body 12. The cap 16 has a peripheral skirt 66 that includes opposed front and rear flaps, 68 and 70, and opposed side flaps, 72 and 74. As best illustrated in FIGS. 9 and 10, the front and rear flaps, 68 and 70 extend a greater distance from the end wall 64 then do the sidewall flaps, 72 and 74, thereby forming ears or extensions 76.

When the cap 16 is secured to the container body 12, the ears or extensions 76 extend onto and overlap the front and rear walls, 32 and 34, of the container body 12, whereas the side flaps, 72 and 74, of the cap skirt 66 extend within the same plane as the corresponding sidewalls, 36 and 38, of the container body 12 with a small open gap 78 (see FIG. 1) being formed therebetween. In addition, preferably the mouth finish 44 of the container body 12 adjacent the rim 46 is formed at a slight inward taper to ensure tight engagement between the ears or extensions 76 and the front and rear walls, 32 and 34, of the container body 12. Further, preferably the end tips of the ears or extensions 76 have a beveled edge.

The above described features with respect to the cap 16 and body 12 permit the package 10 to achieve desired levels of child-proofing. For example, the overlapping relation of the ears or extensions 76 on the front and rear walls 32 and 34 of the container body 12, the slight taper of the mouth finish 44 of the container body 12, the beveled edge of the ears or extensions 76, and the latches 60, recesses 62, and tabs 80 provide a combined effect that makes it difficult for a young child to remove the cap 16 from the container body 12 and unlock the latches 60 from the locking recesses 62 in an undesired manner. Of course, if child-proofing properties are not required, a package can be made without at least some of these features.

Preferably, the cap 16 snaps onto the mouth finish 44 of the container body 12 and requires multiple simultaneously manipulations by the end-user to be removed from the container body 12. As an example, the container body 12 and cap 16 can be designed so that removal is accomplished only by the simultaneous actions of depressing the cap 16 relative to the container body 12 and sliding the cap 16 laterally relative to the container body 12 toward one of the sidewalls, 32 or 34, of the container body 12.

The mechanism for creating the cap-to-container body connection can be provided by a series of lugs 82 located on the inside of the cap skirt 66 and a series of slots, or channels, 84 formed in the mouth finish 44 of the container body 12. For instance, see FIG. 9. The slots 84 provide pathways along which the lugs 82 are permitted to travel when the cap 16 engages the container body 12. As an alternative, the lugs can extend from the mouth finish of the container body, and slots can be formed in the cap skirt.

As shown in FIG. 9, preferably a pair of slots 84 is provided on each side of the elongate opening 48 of the container body 12. Each slot 84 includes an open top 86 through which a corresponding lug 82 can enter and a reversely-turned section 88 in which the lug 82 can be captured thereby retaining the cap 16 to the container body 12. As illustrated, the slots 84 have a substantially "J" or "U" shaped configuration. The upper portion of each reversely-turned section 88 includes a perimeter wall or like obstruction that prevents movement of the lug 82 in forward and lateral directions. A spring or like mechanism 90 is located within the cap 16 and exerts a force that biases the cap 16 away from the container body 12. Thus, when the lugs 82 are located within the reversely-turned sections 88 of the slots 84, the spring 90 exerts a force between the cap 16 and container body 12 that prevents the lugs 62 from escaping the reversely-turned sections 88. This locks the cap 16 to the container body 12 and prevents unwanted removal of the cap 16 without the manipulations discussed above.

Preferably, the spring 90 is a leaf spring or the like and is mounted on the underside of the end wall 64 of the cap 16 so that, when the cap 16 is engaged to the container body 12, the spring 90 engages the rim 46 or other part of the container body 12. As an example, FIG. 10 illustrates a spring 90 having an H-shaped configuration which is curved, or bowed, along its length. The spring 90 is captured within the cap 16 by the lugs 82 and/or other abutments (not shown) formed on the underside of the end wall 64 of the cap 16. When the cap 16 is secured to the container body 12, the H-shaped spring 90 applies a force to lock the lugs 82 within corresponding slots 84. When pressure is exerted downwardly on the cap 16, the spring 90 flattens thereby permitting the lugs 82 to exit the slots 84. Upon removal of the force, the spring 90 automatically and resiliently returns to its original and memorized bowed configuration.

In use, the plastic, relatively-rigid, substantially-rectangular package 10 can be used to store a separate blister card 14 carrying a predetermined amount of tablets, such as doses of prescribed or over-the-counter medicines, vitamins, supplements, or the like. Indicia, such as days, dates, or other information, can be displayed directly on the cards 14 to provide the end-user with reminders as to the rate at which the doses should be taken. Indicia and/or labels can also be applied to the front and back of the container body 12. Further, the cap 16 and container body 12 can include alignment markings that aid the user in properly aligning the cap 16 with the container body 12.

As discussed above, an end-user removes the cap 16 by pressing the cap 16 toward the container body 12 and simultaneously sliding the cap 16 in a lateral direction as can be indicated by arrows or like indicia on the cap 16. After the cap 16 is removed, the end-user grips an exposed edge section or the like of one of the blister card 14 adjacent the mouth finish 44 of the container body 12 and slides the blister card 14 such that it extends partially out of the container body 12. Alternatively, the blister card 14 may be caused to slide out of the container body 12 via a quick hand flicking motion of the container body 12. When the distal end 52 of the blister card 14 reaches the elongate opening 48 of the container body 12, further movement of the blister card 14 is prevented. In this dispensing position, the card 14 extends from the mouth finish 44 of the container body 12 and the blister compartments 26 can be accessed. After one or more tablets have been removed from the blister card 14, the blister card 14 is returned to within the container body 12 to a fully retracted storage position. Thereafter, the cap 16 can be reapplied and snapped into place on the container body 12. This process can be repeated until all blister compartments 26 are empty.

When blister card replacement is desired, the tabs 80 are squeezed toward one another to release the connection between the front and rear body sections, 18 and 20. The body sections are then pivoted about hinge, or hinges, 24 to an open loading condition. The spent card can be removed and replaced with a new card carrying a fresh supply of tablets or the like. The body sections, 18 and 20, are pivoted together, and the latches 60 automatically snap into the locking recesses 62 to lock the body sections together and form the container body 12 with the new card captured therein.

While preferred unit dose packages have been described in detail, various modifications, alterations, and changes may be made without departing from the spirit and scope of the unit dose package according to the present invention as defined in the appended claims.

The invention claimed is:

1. A package for storing and dispensing tablets or like separate items, comprising:
   a hollow container body having a closed end and an opposite end with an elongate opening defined by a rim; and
   a tray with a plurality of tablets or items separately secured thereto for being dispensed from said container body, said tray being slidable relative to said container body such that said tray is slidable between a retracted position in which said tablets or items are located entirely within said container body and a dispensing position in which a proximal part of said tray holding said tablets or items extends externally of said container body via said opening of said container body and in which a distal end part of said tray is captured and retained within said container body;
   said container body including opposed front and rear body sections having locking portions that cooperatively engage to lock said front and rear body sections together in a closed position to form said container body, said locking portions being releasable to position said front and rear body sections in an open tray re-loading position; and
   said distal end part of said tray including an upstanding post, flange, or wall and one of said front and rear body sections including a post, flange, or wall extending within said container body adjacent said elongate opening of said container body, said post, flange or wall of said body sections and said tray being cooperatively engageable to prevent said distal end part of said tray from passing through said elongate opening of said container body.

2. A package according to claim 1, wherein said locking portion of one of said front and rear body sections includes a latch, and wherein said locking portion of the other of said front and rear body sections includes a locking recess into which said latch is extendable.

3. A package according to claim 2, wherein said container body includes at least one tab that can be pressed to disengage said locking portions thereby permitting at least one of said front and rear body sections to move to said open tray re-loading position.

4. A package according to claim 1, wherein said tray includes at least separate first and second trays, wherein said hollow container body retains said first tray, and wherein, when said front and rear body sections are in said open tray re-loading position, said first tray is removable and replaceable with said second tray.

5. A package according to claim 1, wherein said front and rear body sections are interconnected at said closed end with at least one hinge that permits at least one of said front and rear body sections to pivot about said hinge to said closed position and to said open tray re-loading position.

6. A package according to claim 5, wherein said container body is a one-piece, plastic, injection-molded body such that said hinge is formed integral with said front and rear wall sections and provides at least one live hinge therebetween.

7. A package according to claim 4, wherein each of said trays is a blister card and includes a plurality of separate blister compartments for separately securing said tablets or items to said tray.

8. A package according to claim 1, further comprising a separate plastic cap removably securable to said rim of said assembled container body to seal said opening and prevent access to said tablets or items within said container body.

9. A package according to claim 8, wherein said cap has an elongate end wall and a skirt depending therefrom, wherein said skirt includes opposed front and rear flaps and opposed side flaps, and wherein said front and rear flaps overlap said rim of said container body when said cap is applied to said container body and said side flaps of said skirt do not overlap said container body.

10. A package according to claim 9, wherein a spring is mounted on an underside of said end wall of said cap.

11. A package according to claim 10, wherein said spring is made of plastic and is bowed along its length.

12. A package according to claim 11, wherein one of said container body and cap has a series of lugs and the other has a series of channels in which said lugs are captured when said cap is engaged to said container body.

13. A package according to claim 12, wherein each of said channels is formed in an outer surface of a mouth finish of said container body and has a reversely-turned section and an open section, whereby removing said cap from said container body requires said cap to be pressed toward said container body against the force of said spring and slid laterally so that said lugs are permitted to exit said reversely-turned sections and be released through said open sections.

14. A package for storing and dispensing tablets or like separate items, comprising:
   a hollow container body having a closed end and an opposite end with an elongate opening defined by a rim; and
   a tray with a plurality of tablets or items separately secured thereto for being dispensed from said container body, said tray being slidable relative to said container body such that said tray is slidable between a retracted position in which said tablets or items are located entirely within said container body and a dispensing position in which a proximal part of said tray holding said tablets or items extends externally of said container body via said opening of said container body and in which a distal end part of said tray is captured and retained within said container body;
   said container body including opposed front and rear body sections having locking portions that cooperatively engage to lock said front and rear body sections together in a closed position to form said container body, said locking portions being releasable to position said front and rear body sections in an open tray re-loading position;
   said locking portion of one of said front and rear body sections including a latch, and said locking portion of the other of said front and rear body sections including a locking recess into which said latch is extendable, and said container body including at least one tab that can be pressed to disengage said locking portions thereby permitting at least one of said front and rear body sections to move to said open tray re-loading position;
   said front and rear body sections being interconnected at said closed end with at least one hinge that permits at least one of said front and rear body sections to pivot about said hinge to said closed position and to said open tray re-loading position, and said container body being a one-piece, plastic, injection-molded body such that said hinge is formed integral with said front and rear wall sections and provides at least one live hinge therebetween; and
   said distal end part of said tray including an upstanding post, flange, or wall, and one of said front and rear body sections including a post, flange, or wall extending within said container body adjacent said opening of said container body, and said post, flange or wall of said body sections and said tray being cooperatively engageable to prevent said distal end part of said tray from passing through said opening of said assembled container body.

15. A package for storing and dispensing separate tablets, comprising:
   a hollow, relatively-thin, elongate, one-piece plastic container body that when assembled defines a closed end and an opposite open end having an elongate opening defined by a rim, said container body consisting of opposed front and rear body sections extending from said closed end to said open end and being interconnected at said closed end with at least one hinge, at least one of said front and rear body sections being rotatable about said at least one hinge to position said one-piece container body in a closed position to form said assembled hollow container body and to an open re-loading position;
   a blister card carrying a plurality of separate tablets within separate blister compartments, said card being slidable relative to said container body such that said card is slidable between a retracted position in which said tablets are located entirely within said container body and a dispensing position in which a proximal part of said card holding said tablets extends externally of said container body via said opening of said container body and in which a distal end part of said card is captured and retained within said container body; and
   a separate plastic cap removably securable about said rim of said assembled container body to seal said opening and prevent access to said tablets carried by said blister card and located within said container body;
   said distal end part of said card including an upstanding wall and one of said front and rear body sections including a post or flange extending within said container body adjacent said open end of said container body, said post or flange and said upstanding wall being cooperatively engageable to prevent said distal end part from passing through said open end of said assembled container body.

16. A package according to claim 15, wherein said front and rear body sections include locking portions that cooperatively engage and automatically lock said front and rear body sections together when said front and rear body sections are placed in said closed position.

17. A package according to claim 16, wherein said locking portion of one of said front and rear body sections includes a resilient latch, and wherein said locking portion of the other of said front and rear body sections includes a locking recess into which said latch is extendable.

18. A package according to claim 17, wherein said container body includes a pair of opposed tabs that can be pressed toward one another to disengage said latch from said locking recess thereby permitting at least one of said front and rear body sections to pivot about said at least one hinge to said open re-loading position.

19. A package according to claim 15, wherein a leaf spring is mounted on an underside of an end wall of said cap, and wherein said spring is bowed along its length.

20. A package according to claim 19, wherein one of said container body and cap has a series of lugs and the other has a series of channels in which said lugs are captured when said cap is engaged to said container body.

21. A package according to claim 20, wherein each of said channels is formed in an outer surface of a mouth finish of said container body and has a reversely-turned section and an open section, whereby removing said cap from said container body requires said cap to be pressed toward said container body against the force of said spring and slid laterally so that said lugs are permitted to exit said reversely-turned sections and be released through said open sections.

22. A package according to claim 15, wherein said container body is an injection-molded body, and said at least one hinge is at least one live hinge located between said front and rear body sections.

23. A package according to claim 15, wherein said blister card includes a set of at least separate first and second blister cards, wherein said assembled container body retains said first blister card, and wherein, when said front and rear body sections are in said open re-loading position, said first blister card is removable and replaceable with said second blister card.

* * * * *